United States Patent [19]

Salathiel

[11] Patent Number: 4,517,102

[45] Date of Patent: May 14, 1985

[54] METHOD OF BREAKING AN EMULSION AND AN EMULSION-EMULSION BREAKER COMPOSITION

[75] Inventor: William M. Salathiel, Houston, Tex.

[73] Assignee: Exxon Production Research Co., Houston, Tex.

[21] Appl. No.: 164,703

[22] Filed: Jun. 30, 1980

[51] Int. Cl.³ .................................................. C09K 3/00
[52] U.S. Cl. ................................ 252/8.55 R; 252/309; 252/358; 252/333
[58] Field of Search ............... 252/309, 358, 332, 333, 252/8.55 R

[56] References Cited

U.S. PATENT DOCUMENTS

| | | | |
|---|---|---|---|
| 2,543,223 | 2/1951 | Blair | 252/338 |
| 3,112,276 | 11/1963 | Kirkpatrick | 252/338 |
| 3,907,701 | 9/1975 | Liebold et al. | 252/358 |
| 3,977,472 | 8/1976 | Graham et al. | 252/8.55 R |
| 4,033,415 | 7/1977 | Holtmyer et al. | 252/8.55 R |
| 4,120,815 | 10/1978 | Raman | 252/358 |
| 4,202,795 | 5/1980 | Burnham et al. | 252/358 |
| 4,261,812 | 4/1981 | Newcombe | 252/332 |
| 4,277,352 | 7/1981 | Allison et al. | 252/332 |
| 4,316,808 | 2/1982 | Blair | 252/358 |

Primary Examiner—Josephine L. Barr
Attorney, Agent, or Firm—James H. Riley, Jr.; Kenneth C. Johnson

[57] ABSTRACT

This invention relates to a composition of matter and to a method for producing a controllable, residue-free break of an emulsion or a dispersion of a water-in-oil emulsion. An emulsion breaker is incorporated into the emulsion. It is temporarily-protected (deactivated) so that breaking of the emulsion is initially avoided. By removing the protection, the breaker becomes active, and it acts to break the emulsion into its separate phases.

25 Claims, 5 Drawing Figures

METHOD OF BREAKING AN EMULSION AND AN EMULSION-EMULSION BREAKER COMPOSITION

BACKGROUND OF THE INVENTION

1. The Field of the Invention

This invention relates to an emulsion-emulsion breaker composition and to a method of breaking an emulsion or a dispersion of an emulsion by use of a chemical breaker, which is incorporated into the emulsion and which allows a controllable, residue-free break of the emulsion. The invention is particularly useful for well treatment operations where emulsions or dispersions of emulsions are injected into subterranean formations. The method of this invention more particularly relates to incorporating within an emulsion a deactivated emulsion breaker which a protecting group temporarily protects. Preferably the protecting group is bonded to the emulsion breaker through an ester bond. The ester bond hydrolyzes to form the active breaker; the protecting group is removed. When there is a sufficient amount of active breaker in the emulsion, the emulsion will break into its separated phases.

2. Description of the Prior Art

Emulsions are widely used. They are especially useful in certain well treatment operations because they provide necessary rheological properties at significant fluid cost savings. For example, in hydraulic fracturing operations, use of a water-in-oil emulsion or a dispersion of a water-in-oil emulsion (an emulsion slurry) can reduce the oil cost while maintaining the desired viscosity properties. Nevertheless, breaking of the emulsion after injection is sometimes a beneficial, if not essential, step in the treatment. The rheological properties beneficial for fracturing are liabilities for cleaning the fracture. Easier cleaning would be possible if the break of the emulsion-fracturing fluid could be controlled.

Generally, emulsions may be broken by adding demulsifiers to the pre-existing emulsions. The demulsifiers act with the surfactants (which induce emulsification and encapsulation) to cause an inversion and separation of the emulsion phase. Unfortunately, adding demulsifiers to injected emulsions is impossible. When the fluids are not being pumped, mixing is limited to the interface. Pumping would require further displacement of the emulsion within the formation. Therefore, in well treatment operations, several alternative schemes are used. In one system, the emulsion surfactant is selected so that it will prefer to wet the surface of the formation rock. In this way, as the emulsion passes into the formation, the surfactant is removed from the emulsion in sufficient amount to cause separation. In a second system, a mixture of surfactants is selected so that the emulsion will become unstable above a certain temperature. As the fluid temperature rises toward the formation temperature, the emulsion breaks. In a third system, the emulsion may be broken mechanically. The emulsion droplets break when they are squeezed into pores within the formation. Improvements in this technology are still desirable.

This invention presents a novel emulsion-emulsion breaker composition and a novel breaker method wherein a breaker is initially protected, is incorporated within the emulsion, and subsequently loses its protection to form an active breaker which breaks the emulsion without producing undesirable residues in the formation. The invention allows greater control of the break with reduced fluid costs for the treatment fluid.

SUMMARY OF THE INVENTION

A method of breaking an emulsion generally comprises the steps of (1) forming an emulsion wherein a temporarily-protected (deactivated) emulsion breaker is incorporated into the emulsion, and (2) activating the temporarily-protected breaker by removing the protecting group to form the breaker in a sufficient amount to break the emulsion. This method is particularly useful in well treatment operations where the rheological properties of emulsions or their encapsulation capabilities are desirable for a period of time, but are detrimental thereafter. By controlling the rate of breaking of the emulsion, improved treatments may result.

A method of breaking a water-in-oil emulsion or a water-in-oil emulsion dispersed in an aqueous medium preferably comprises the steps of (1) forming a water-in-oil emulsion which comprises an internal aqueous phase and an external, oil phase comprising a blend of a liquid hydrocarbon, a surfactant, and a temporarily-protected emulsion breaker, and (2) removing the protecting group from the breaker to break the emulsion. The use of a breaker preferably allows a controllable residue-free break, which is especially desirable in well treatment operations. The break rate is controlled by the temperature of the emulsion and the concentration of breaker incorporated therein. Preferably the breaker initially serves as a co-surfactant to reduce surfactant costs in the oil phase. Preferably the mechanism for activation of the breaker is hydrolysis of the bond between the breaker and its protecting group.

The method preferably employs an ester of a chemical breaker as the chemical compound initially incorporated into the emulsion. This ester is subsequently hydrolyzed in a sufficient amount to form the activated breaker which breaks the emulsion. Preferred esters are alkylbenzene sulfonic acid esters;

and alkylbenzene phosphoric acid esters;

$R_1$ is an alkyl group preferably of between 4 and 18 carbon atoms. $R_2$ is a carbon chain short enough so that the protected breaker initially displays co-surfactant properties. $R_2$ may have hydrophilic residues appended to its carbon chain and may consist of a plurality of such carbon chains linked by other atoms. Whether the benzene ring substitution is ortho- (o-), meta- (m-), or para- (p-) will depend on the order of alkylation and sulfonation during preparation of these compounds. Each isomer is suitable for use as a chemical breaker. For convenience, only the paraisomer will be shown in this specification. Particularly preferred esters are 2-hydroxypropyldodecylbenzenesulfonate;

and hydroxyethyldodecylbenzenesulfonate;

Further preferred esters which are readily prepared by the reaction of alkylene oxides and sulphonic acids include esters selected from the group consisting of:

wherein m=1-3. The most preferred esters are mixtures prepared by this reaction wherein m=2.5. The m value indicates the average composition of the compounds in the mixture.

Similarly, a method of breaking an oil-in-water emulsion preferably comprises the steps of (1) forming an oil-in-water emulsion which comprises an internal, oil phase and an external aqueous phase comprising a blend of water, a surfactant, and a temporarily-protected (deactivated) emulsion breaker, and (2) removing the protecting group from the breaker to break the emulsion. As with the water-in-oil system, this breaker preferably serves as a co-surfactant when it is deactivated and protected. Also, hydrolysis of the bond between the active breaker and the protecting group is the preferred mechanism for activation of the breaker. Selection of the chemical breaker permits a controllable, residue-free break dependent upon the temperature of the emulsion and the concentration of the breaker incorporated therein. The method preferably employs a sulfate ester of either an ethoxylated alcohol;

or an ethoxylated alkylphenol;

wherein m is 1, 2, 3, or 4, and $R_1$ is an alkyl group, preferably comprising from 4 to 24 carbon atoms. More preferably $R_1$ is an alkyl group of 8 to 24 carbon atoms. Mixtures of preferred breakers may be used.

A novel composition of matter generally comprises the mixture which constitutes the emulsion-emulsion breaker system. The novel compositions of matter generally comprise an emulsion either of the water-in-oil type or oil-in-water type to which is added a temporarily-protected (deactivated) emulsion breaker. Generally the compositions will comprise an internal phase and an external phase comprising a blend of the major component of the external phase (water or a liquid hydrocarbon), a surfactant, and a temporarily-protected, deactivated emulsion breaker. Preferably the emulsion breaker initially serves as a co-surfactant. Preferably hydrolysis of the bond between the active breaker and the protecting group forms the active breaker at a rate which produces a sufficient amount of active breaker in the emulsion when the emulsion properties become detrimental to continuing well treatments. For water-in-oil emulsion systems, alkylbenezenesulfonic acid esters and alkylbenezenephosphoric acid esters are the preferred deactivated breakers. For oil-in-water emulsions, sulfate esters of ethoxylated alcohols and ethoxylated alkylphenols are preferred. Those skilled in the art will recognize that other compounds are also useful as temporarily-protected emulsion breakers (the choice being dependent upon the use for the emulsion). Examples of other componds, which hydrolyze, are acid chlorides and amides.

DESCRIPTION OF THE PREFERRED EMBODIMENTS

This invention generally relates an emulsion-emulsion breaker composition and to a method of breaking an emulsion or a dispersion of a water-in-oil emulsion. The preferred use of this method is for hydraulic fracturing with an emulsion slurry fracturing fluid. Therefore, discussion will focus on that use, although the concept of this invention may be used elsewhere.

1. The emulsion slurry

Briefly, an emulsion slurry is a water-in-oil emulsion grossly dispersed in an aqueous medium. The water-in-oil emulsion comprises an internal aqueous phase and an external oil phase comprising a blend of a liquid hydrocarbon and a surfactant. A novel feature of this invention incorporates a temporarily-protected emulsion breaker into the oil phase blend. Preferably, this chemical breaker serves as a co-surfactant until it is hydrolyzed into its activated state. For most well treatments, the water-in-oil emulsion preferably comprises about 30 to 90% by volume of the total dispersion (emulsion slurry). More preferably, the emulsion comprises about 60 to 80% by volume of the total dispersion.

The water-in-oil emulsion may be prepared by vigorously mixing a liquid hydrocarbon-surfactant blend with increasing quantities of an aqueous fluid to form a stable, fine-grained emulsion. The hydrocarbon-surfactant blend contains a soluble surfactant in a concentration generally between 0.5 to 40 weight percent of the blend, and preferably between 3 to 25 weight percent. The external oil phase blend preferably comprises 3 to 50 percent of the total volume of the emulsion, and most preferably, 5 to 25 percent. Once a stabilized emulsion is prepared, it is dispersed in an aqueous medium to form an emulsion slurry. Since the overall oil phase concentration in the dispersion will generally be less than about 25 percent, the well treatment compositions used in the present invention are much lower in cost than conventional oil-in-water emulsions. The cost advantage arises because conventional oil-in-water emulsions have significantly higher oil contents.

An emulsion slurry may also be prepared by:
(1) preparing an oil-surfactant blend;
(2) preparing an aqueous solution useful for formation treatment;
(3) shearing the blend while adding the solution to form a water-in-oil emulsion with a water-to-oil ratio between 10:1 to 13:1; and
(4) increasing the shear rate to reduce the droplet size and to cause the emulsion to shed solution (which forms the dispersing phase).

The emulsion droplet formation is surfactant limited. Shearing creates smaller droplets with a consequent increase in surface area. The surfactant molecules align themselves upon this surface and stabilize the droplets. With the small droplet size, some solution is necessarily excluded from encapsulation. This excluded solution forms the dispersing solution for the water-in-oil emulsion.

An oil-surfactant blend can use a number of liquid hydrocarbons as a base. The liquid hydrocarbon can be crude oil or a refined petroleum fraction such as diesel oil, gas oil, gasoline, kerosene, or gas condensate. Furthermore, the liquid hydrocarbon may be a particular hydrocarbon such as benzene, toluene, ethylbenzene, cyclohexane, hexane, decane, hexadecane, and the like. Similarly, mixtures of these liquid hydrocarbons may be used. Diesel oil is preferred. It is usually readily available at a well site and is compatible with hydrocarbon-bearing formations. If diesel oil is unavailable, crude oil or liquid hydrocarbons having a viscosity less than about 10 centipoise, measured at the temperature of the formation, are preferred.

Typically, surfactants are blended with the liquid hydrocarbon. Surfactant concentration may be in the range of about 0.5 to about 40 weight percent of the surfactant-hydrocarbon mixture. It is preferred that the overall surfactant concentration be 3 to 25 weight percent. Surfactants useful in forming a compatible mixture with liquid hydrocarbons include anionic, cationic, and nonionic surfactants. Suitable anionic surfactants include fatty acid soaps which are the salts of long chain fatty acids derived from naturally occurring fats and oils and salts of alkylbenzene sulfonic acids. A preferred anionic surfactant is the morpholinium salt of tetracosanylbenzene sulfonic acid. The ammonium and alkali metal salts are also suitable. Cationic surfactants include amine salts, such as polyoxyethylene amine, and quaternary ammonium compounds. Particularly useful cationic surfactants include high molecular weight alkyl imides and amides of polybasic amines. A highly preferred cationic surfactant of this type is a succinimide sold under the tradename ECA 4360J by Exxon Chemical Company. Suitable nonionic surfactants include derivatives of glycerides, glucosides, polyoxyethylene, and polyoxypropylene. Typical nonionic surfactants include ethoxylated linear alcohols and ethoxylated alkyl phenols. A preferred nonionic surfactant is a sorbitan monooleate, which Atlas ICI sells under the tradename Span 80. Mixtures of surfactants can also be used. For example, mixtures of Span 80 and ECA 4360J are particularly suited to forming stable, water-in-oil emulsions.

As a novel feature of this invention, a temporarily-protected (deactivated) emulsion breaker is preferably added to the oil-surfactant blend. Preferably this chemical breaker serves initially as a co-surfactant. By doing so, its inclusion may reduce the surfactant requirements and the overall cost of the fluid. The details of this emulsion breaker will be discussed as soon as the discussion of an emulsion slurry is completed.

Minimizing the size of the internal phase water droplets increases the stability of the emulsion. Small aqueous droplets can be prepared by thoroughly emulsifying the aqueous and hydrocarbon phases. Preferably, emulsification is accomplished by slowly pouring the aqueous component into the surfactant-hydrocarbon blend while vigorously stirring or shearing the mixture. In oil field operations, mechanical mixing equipment or blenders may be used to impart the desired shear to the mixture. The fine grained emulsion generally contains from 3 to 40 volume percent of the liquid hydrocarbon phase; the preferred concentration being 5 to 25 volume percent. The internal water-in-oil emulsion is viscous (approximately 100,000 centipoise); it is apparently stable for months at temperatures below 200° F. (91.3° C.).

A dispersion of the water-in-oil emulsion (an emulsion slurry) may be achieved by a simple mixing operation in which the stabilized emulsion is gently contacted with an aqueous medium. Preferably, the emulsion is added to the aqueous medium under conditions of shear which cause the emulsion to disperse into the aqueous medium. Initially, additional water may become incorporated into the original emulsion. The capacity of the emulsion to accept more internal phase water will be exceeded and the excess fluid will consequently separate from the emulsion to form a continuous aqueous phase surrounding small dispersed masses of water-in-oil emulsion. Depending upon mixing conditions and numerous other factors, the masses of emulsion dispersed in the aqueous medium may vary anywhere in size from individual, microscopic droplets having an internal aqueous core coated with a thin oil membrane to coarse aggregates or globules.

Preferably, the emulsion comprises from 30 to 95 volume percent of the mixture, and more preferably from 60 to 80 volume percent. Since the liquid hydrocarbon concentration is only about 5 to 40 percent of the emulsion, the overall hydrocarbon concentration for the well treatment mixture will normally be between about 3 and 40 volume percent. Thus, the oil cost of the treatment fluid may be greatly reduced.

Especially when the dispersed emulsion globule size is small, stabilizing the emulsion slurry may be necessary to avoid premature separation of the dispersed emulsion from the aqueous medium. Several techniques accomplish stabilization. One technique is to control the ratio of emulsion to aqueous medium so that the emulsion comprises a major proportion of the mixture. Minimizing gravitational separation forces through density control of the emulsion and aqueous medium is a second technique. Careful selection of the liquid hydrocarbon phase or addition of weighting agents to the internal aqueous phase of the emulsion provides the desirable density control. For example, the addition of salts such as sodium chloride (NaCl), or potassium chloride (KCl) will serve to equalize the densities of the dispersed emulsion phase and the external aqueous phase. Likewise, the use of moderate density, middle distillates (e.g., diesel oil) for the liquid hydrocarbon phase of the emulsion will stabilize the dispersion. Small amounts of water soluble surfactants may also be added to the aqueous medium to enhance the stability of the dispersion, when the dispersion is of the fine type. For example, water soluble surfactants can be added to the aqueous medium in quantities of from about 0.01 to 5.0 weight percent and preferably about 0.1 percent. A suitable, water-soluble surfactant for this purpose is a polyoxyethylene (20) sorbitan monooleate, which Atlas ICI sells under the tradename Tween 80. Caution must be exercised, however, in selecting and using a surfactant in the aqueous medium. Under high shear, the use of excessive quantities of a water-soluble surfactant can cause inversion of the original emulsion rather than stabilization of the dispersion.

2. The chemical breaker

A method of breaking a water-in-oil emulsion generally comprises the steps of (1) forming a water-in-oil emulsion which comprises an internal, aqueous phase and an external, oil phase comprising a blend of a liquid hydrocarbon, a surfactant, and a temporarily-protected (deactivated), emulsion breaker; and (2) breaking the emulsion by removing the protection from the breaker to activate it. The method is equally applicable to breaking an emulsion slurry. Preferably the emulsion breaker allows a controllable, residue-free break of the emulsion into its separate phases. Furthermore, the deactivated breaker preferably serves initially as a co-surfactant for the emulsion system until its protection is removed. The deactivated breaker is preferably an ester which hydrolyzes to form the active, unprotected breaker. The rate of hydrolysis should be sufficiently fast that a sufficient amount of breaker be formed within a reasonable time. The break of the emulsion is dependent upon the emulsion temperature and the initial, deactivated breaker concentration. These factors provide the control of the break, which is a valuable feature of this system for well treatment operations.

The preferred breakers of this invention are selected from the group consisting of alkylbenzenesulfonic acid esters;

and alkylbenzene phosphoric acid esters;

$R_1$ is preferably an alkyl group. $R_1$ may be a substituted alkyl group. Its function is to provide an oleophilic end to the breaker. $R_2$ is preferably selected from the group consisting of alkyl groups having between 1 and 3 carbon atoms, hydroxylated alkyl groups having between 2 and 4 carbon atoms, and di- and trialkylene glycol residues formed from the condensation of ethylene oxide, propylene oxide, or butylene oxide. These compounds have preferred characteristics for well treatment operations. The hydrolysis rate is sufficiently slow to allow injection of the emulsion or emulsion slurry into the formation. Yet, the hydrolysis rate is sufficiently fast so that, within a reasonable time, the emulsion or emulsion slurry breaks in the formation either to treat the formation, to allow further treatments of the formation to be done more readily, or to facilitate unobstructed production. In other words, chemical breakers of this sort cause the favorable emulsion properties to be lost when they become liabilities to further treatment. Alkylbenzenesulfonic acid esters and alkylbenzenephosphoric acid esters produce a residue-free break of the emulsion. They maintain the fracture conductivity as high as possible. Furthermore, these compounds may initially serve as co-surfactants to reduce the treatment fluid cost.

A further way to characterize the $R_2$ group of the preferred breakers is to select $R_2$ from the group consisting of methyl; ethyl; propyl; butyl; compounds represented by the formula:

wherein
m = 1, 2, or 3 and
l = 0, 1, or 2;
and compounds represented by the formula:

wherein
l = 0, 1, or 2 and
k = 0, 1, or 2.

Preferably the alkyl group on the alkylbenzenesulfonic acid esters and the alkylbenzenephosphoric acid esters has between 4 and 18 carbon atoms. The alkyl chain is preferably straight to allow enhanced biodegradation. More preferably, the alkyl group has between 8 and 18 carbon atoms in a straight-chain alignment. The most preferred compounds have dodecyl as the alkyl group. The alkyl group preferably is selected so that the temporarily-protected (deactivated) emulsion breaker has hydrophobic character. In this way, the breaker can initially serve as a co-surfactant. The alkyl group, however, preferably will not be so hydrophobic as to impede the breaker when its protection has been removed. Chains between 4 and 18 carbon atoms are preferred. Substituted alkyl groups may be used as well as unsaturated carbon chains (e.g. alkenyls) less than about 18 carbon atoms in length. Alkyl is meant to include all groups which function to provide oleophilic character and which are obvious to those skilled in the art.

Preferably, the temporary protection for the emulsion breaker is provided by an ester bond which may be hydrolyzed at the temperatures of a formation at a reasonable rate to produce the active, unprotected emulsion breaker. The time to break is dependent upon both the temperature of the emulsion and the breaker concentration. With the preferred alkylbenzenesulfonic acid esters and alkylbenzenephosphoric acid esters, preferred ester residues are 2-hydroxypropyl and hydroxyethyl groups. These ester residues are preferred because the temporarily-protected emulsion breakers can be readily formed by the reaction of alkylbenzenesulfonic acids and alkylbenzenephosphoric acids with ethylene oxide or propylene oxide. This reaction often produces mixtures of compounds because the alkylene oxides will react with the terminal —OH groups as well as with the sulfonic acid. This reaction will usually produce a complex reaction product when complete conversion of the sulfonic acid reactant is attained. Generally the products for the propylene oxide reaction will be selected from the group consisting of:

wherein m=1-3. The reaction product mixture can be characterized as an average composition. Generally m=2.5 for the preferred mixture which may be used as the breaker additive. The mixture comprises a distribution of compounds having integral numbers of propylene additives. Similar mixtures may be attained by reacting sulfonic acids with ethylene oxide. The propylene mixtures are preferred. The mixtures are preferred because their use alleviates costly separation of the individual reaction products. The deactivated breakers formed with these reactions produce ester residues which are short enough so that the desired, co-surfactant properties are provided. The carbon chains of higher alkylene oxides would probably render the resulting esters too hydrophobic to produce initial co-surfactant behavior. Reaction with butylene oxide, however, may produce a deactivated emulsion breaker which would be useful in the method of this invention.

The most preferred breakers are 2-hydroxypropyldodecylbenzene sulfonate;

and hydroxyethyldodecylbenzene sulfonate;

The most preferred is 2-hydroxypropyldodecylbenzene sulfonate (2-HPDBS) because it hydrolyzes to produce dodecylbenzenesulfonic acid. Dodecylbenzenesulfonic acid is sufficiently surface active and sufficiently hydrophilic at rather low concentrations to invert the water-in-oil emulsion of an emulsion slurry. The unhydrolyzed 2-HPDBS, however, is not so hydrophilic. While it is interfacially active in water and oil systems, 2-HPDBS is sufficiently oleophilic to be an effective co-surfactant. It initially lends extra stability to the emulsion or emulsion slurry. When it is hydrolyzed in sufficient amounts, the emulsion inverts and separates. This inversion greatly reduces the viscosity of the treatment fluid. Thus, the inversion facilitates rapid, complete clean-up of a fracture. The hydrolysis products of 2-HPDBS leave no residue within the formation and, thereby, produce a fracture with the highest possible conductivity. If the emulsion slurry is used in acidizing, the break will mix the reactive components of a simple or multiple emulsion to produce an acidizing solution within the formation.

Chemicals breakers suitable for the method of this invention preferably have a balance of three features. The deactivated breakers preferably have a characteristic initial solubility so that they may be added to the oil-surfactant blend. They preferably provide initial surfactant behavior to promote stability of the emulsion and to reduce fluid costs. They preferably have a suitable hydrolysis rate so that within a reasonable time the activated breaker may break the emulsion within the formation to facilitate cleanup or further treatment.

EXAMPLE 1

To show the emulsion breaking capacity of alkylbenzenesulfonic acids, laboratory tests were run comparing 2-hydroxypropyldodecylbenzenesulfonate and dodecylbenzenesulfonic acid. The data from these tests is summarized by FIG. 1, which shows a graph of the % emulsion remaining versus time.

Figure 1:
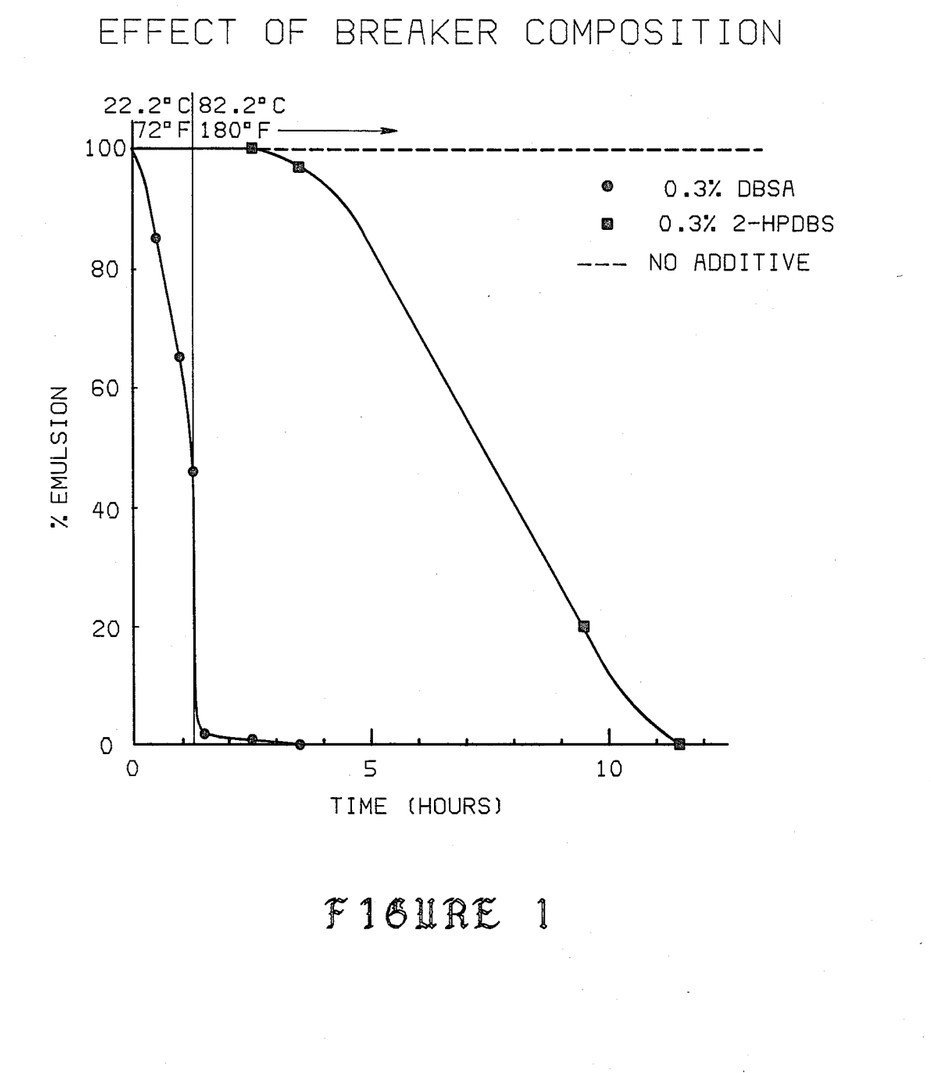
FIG. 1 is a graph which shows the effectiveness of a preferred emulsion breaker in its protected and unprotected forms.

Three, one hundred cubic centimeter (100 cm$^3$) samples of a fresh emulsion slurry were treated with 0.3% by volume dodecylbenzenesulfonic acid, 0.3% 2-hydroxypropyldodecylbenzene sulfonate, and no additive (a control). The samples were placed into a 180° F. (82.2° C.) oven. After seventy-five (75) minutes, the sample's temperature had risen to within one Fahrenheit degree of the oven temperature. The emulsion slurry had a water-to-oil ratio of 13:1. The oil phase comprised a blend of No. 2 diesel oil, a succinimide surfactant (which Exxon Chemical Company sells under the tradename ECA-4360J) and the additive above. The surfactant comprised 10% by volume of the oil phase. The aqueous phase comprised 2% KCl by weight, and 36 ppm of a polyoxyethylene polymer sold under the tradename Polyox. Before being treated, the emulsion had a consistency index, K=189.8 dyne/cm$^2$, and a power law index, n=0.323. K and n are the coefficients in the relation:

$$\text{viscosity} = K \text{ (shear rate)}^{n-1}$$

or $$\text{shear stress} = K \text{ (shear rate)}^n$$

As shown in FIG. 1, the emulsion was rapidly broken by the dodecylbenzene sulfonic acid, while the emulsion's break was significantly delayed by protecting the acid in its 2-hydroxypropyldodecylbenzene sulfonate form. The control which had no additive, was unaltered during the twelve hour test period. It remained substantially unaltered for another eighteen days, at which time it was discarded.

EXAMPLE 2

A second laboratory test showed that an emulsion or emulsion slurry could be made with the temporarily-protected breakers of this invention. In this test 4% by volume of 2-hydroxypropyldodecylbenzenesulfonate (2-HPDBS) or dodecylbenzenesulfonic acid (DBSA) was added to the oil-surfactant blend used to form the emulsion slurry in Example 1. DBSA prevented formation of an emulsion slurry; 2-HPDBS did not appear to affect the emulsion slurry formation process. Thus, the ester of an effective emulsion breaker was compatible with emulsion preparation.

EXAMPLE 3

To show the degree of control of breaking, a series of experiments were run to discover the relationship between the concentration of 2-HPDBS, the temperature, and the break rate. The results of these experiments are summarized in FIGS. 2-4. Five emulsions were prepared. Each emulsion comprised No. 2 Diesel oil, 10% by volume of the succinimide surfactant, ECA-4360J, and an additive. One sample served as a control—no 2-HPDBS was added to it. To the others, 0.1%, 0.3% 2.0% and 4.0% by volume of 2-HPDBS was added. Two hundred cubic centimeter (200 cm³) samples of each emulsion were placed in ovens which had the temperatures regulated at 75° F. (23.9° C.), 125° F. (51.7° C.), 160° F. (71.1° C.), and 200° F. (93.3° C.), respectively. The rate of separation of the emulsion was measured as a function of time.

Figure 2:
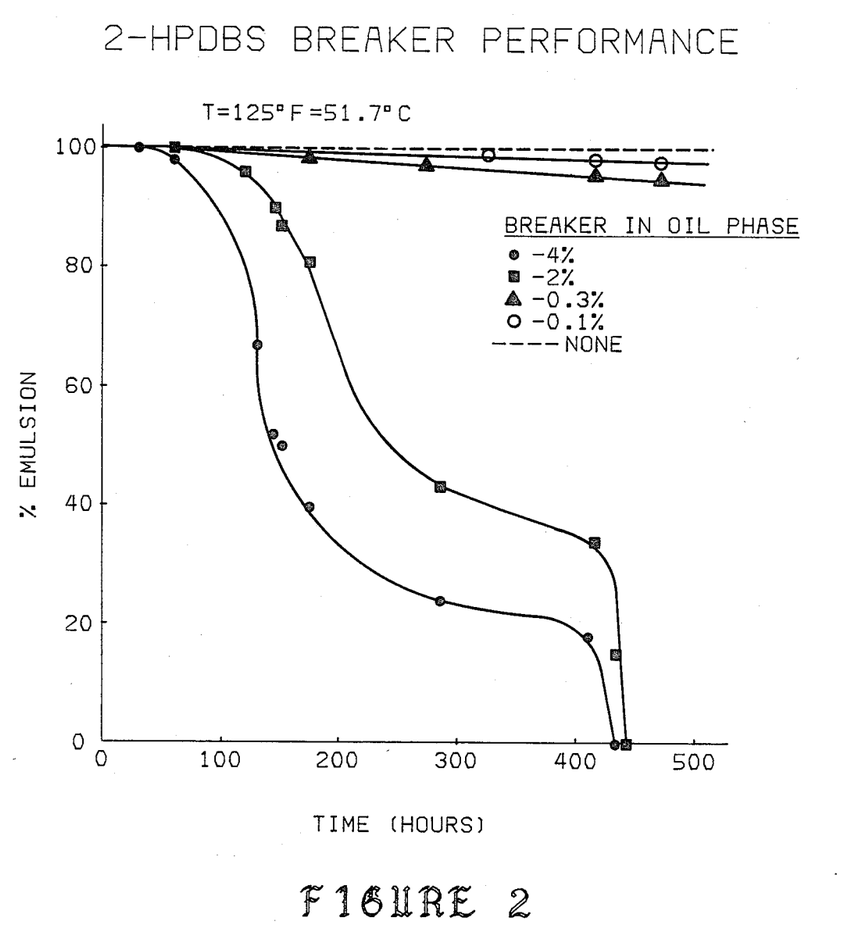
FIG. 2 is a graph which shows the effect of a preferred breaker concentration at 125° F. (51.7° C.).
Figure 3:
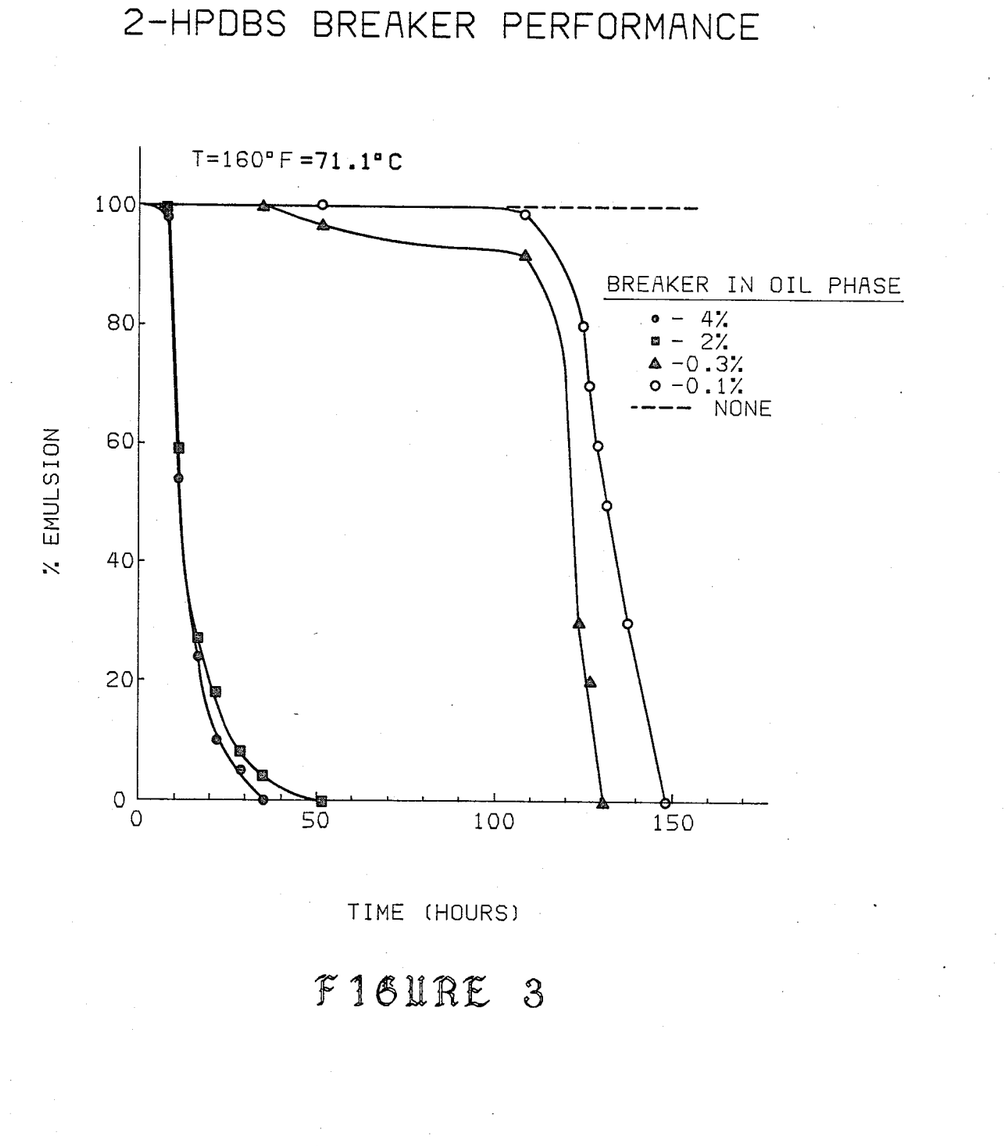
FIG. 3 is a graph which shows the effect of a preferred breaker concentration at 160° F. (71.1° C.).
Figure 4:
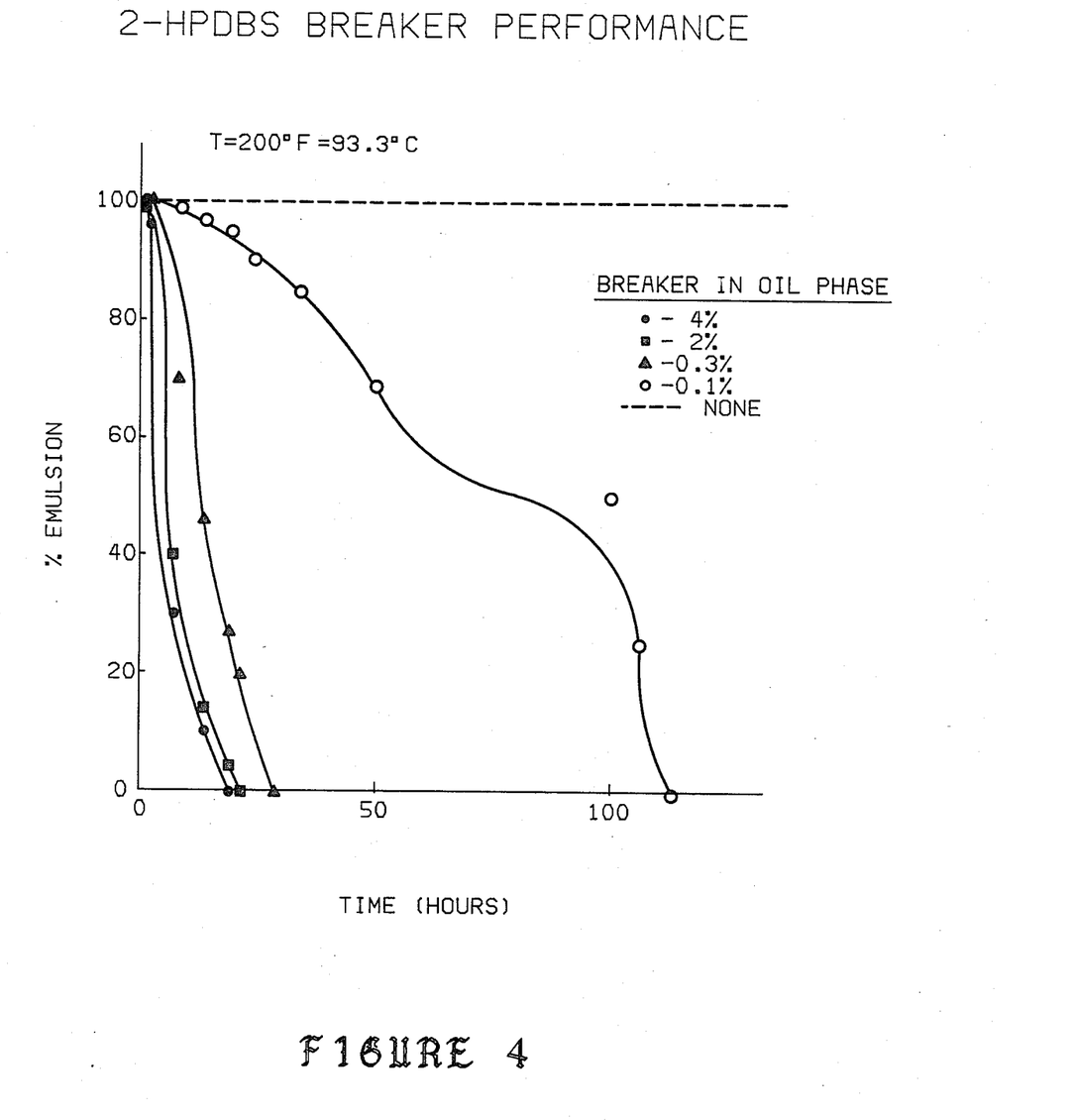
FIG. 4 is a graph which shows the effect of a preferred breaker concentration at 200° F. (93.3° C.).

At 75° F., four of the samples were apparently unchanged at the end of 19 days. Only the sample which included 4% by volume 2-HIDBS showed any measurable change. At the end of 19 days, it was 98% emulsion. Thus, at ambient temperatures, the emulsions are quite stable. They are suitable for use in well treatment operations.

FIGS. 2-4 show the data for the 125° F., 160° F., and 200° F. tests. In general, a lower breaker concentration is required to achieve the same rate of breaking when the temperature of the sample is increased. In other words, the rate of hydrolysis (and the rate of breaking) is directly related to the temperature. Also, the rate of breaking is directly related to the initial concentration of 2-HPDBS in the emulsion. In all of the tests, the fluids were clear and the interfaces were clean. Residues were not observed.

These experiments show that use of a temporarily-protected emulsion breaker, such as 2-HPDBS, is feasible in well treatment operations. Control of the break can be obtained by monitoring the emulsion temperature and the initial concentration of the breaker in the emulsion. Preferably, 2-hydroxypropyldodecylbenzene sulfonate comprises between 0.1% to 4.0% by volume of the water-in-oil emulsion. In planning a treatment, the initial concentration of deactivated breaker must be determined with respect to the particular formation temperature and the desired rate of breaking for the particular treatment operation. Because the hydrolysis rate of hydroxyethyldodecylbenzenesulfonate is similar to that for 2-HPDBS, concentrations of 0.1% to 4.0% by volume will probably be adequate for its use. Faster breaking may be obtained by using higher initial concentrations.

EXAMPLE 4

Figure 5:
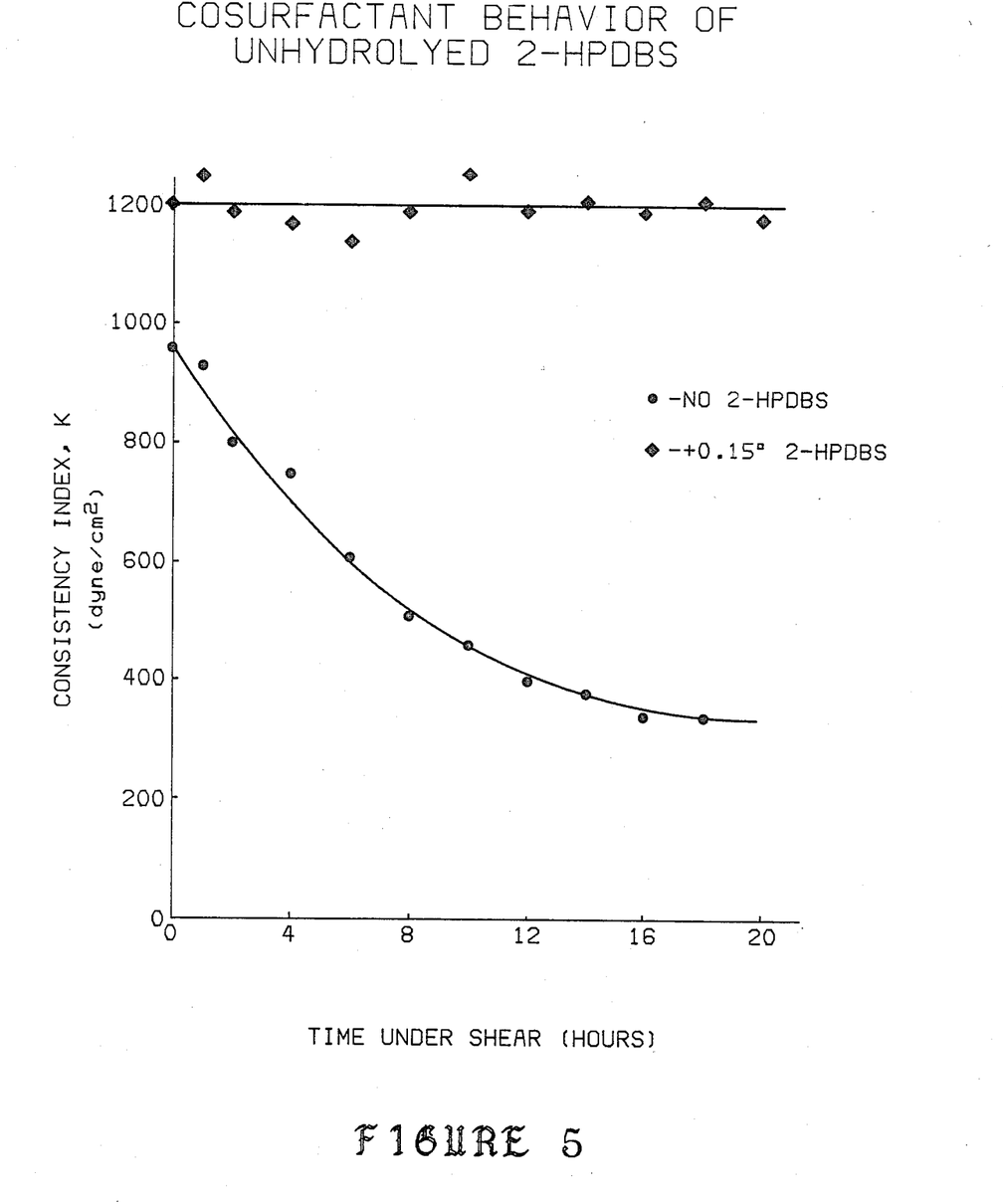
FIG. 5 is a graph of the co-surfactant behavior of a preferred breaker of this invention.

To show the co-surfactant behavior of 2-HPDBS, a series of measurements were made. For these experiments, 930 cm³ of emulsion were stirred in a one quart container by a 3-bladed marine propeller having a 2.6 cm diameter. The propeller was positioned 4 cm from the bottom of the container. Throughout the test period, the blade was rotated at 2500 rpm. One sample had 0.15% by volume 2-HPDBS added to its oil-surfactant blend while the other sample had no 2-HPDBS.

The consistency index, K, is determined by the relation:

$$\text{viscosity} = K \text{ (shear rate)}^{n-1}$$

or $$\text{shear stress} = K \text{ (shear rate)}^n.$$

Fluid samples were analyzed in a Fann 35 viscometer to determine the consistency index, K, and the power law index, n. The tests were designed to show the affect of high shear upon the emulsion. Shear stress on the emulsions will reduce the emulsion drop size until all the surfactant available for forming drops has been used. The consistency index will rise. After long times under shear, however, the size of the drops changes; some grow larger, others, smaller. At this time, the consistency index lowers. Apparently the smallest drops that can be created by the shear field rob the larger drops of surfactant. The larger drops subsequently coalesce. A bimodal distribution of drop sizes results.

FIG. 5 shows that the consistency index decreased over time for the emulsion without added 2-HPDBS. With 2-HPDBS added to the emulsion, the index was essentially constant. The decreasing consistency index showed instability in the emulsion which had no 2-HPDBS. The emulsion with 2-HPDBS had increased surfactant capacity due to the inclusion of 2-HPDBS. Therefore, in using 2-HPDBS as a chemical breaker, the initial concentration of the surfactant may be reduced because the breaker will initially serve as a co-surfactant. Use of the breaker will probably reduce the fluid cost.

To this point, discussion has focused on water-in-oil emulsions or emulsion slurries. These compositions are especially useful in well treatment operations. This invention, however, is equally applicable to oil-in-water emulsions. To control the break of an oil-in-water emulsion, a temporarily-protected, emulsion breaker is incorporated into the external, aqueous phase of the emulsion. When the protecting group is removed from the breaker in sufficient amount, the emulsion breaks. Preferably, hydrolysis will remove the protecting group. The protecting group is preferably bonded to the active breaker through an ester bond, which temporarily protects the emulsion from the breaker. The preferred compounds of this invention for use in oil-in-water systems are sulfate esters of ethoxylated alcohols.

and ethoxylated alkylphenols;

wherein m equals 1, 2, 3, or 4, and $R_1$ is an alkyl group preferably of between 4 and 24 carbon atoms. (Alkyl is used in the sense in which it was defined earlier.) More preferably, $R_1$ is an alkyl group of between 8 and 18 carbon atoms. These compounds may be made, for example, by reacting sulfamic acid with ethoxylated alcohols and ethoxylated phenols. The reactants are well-known in the nonionic surfactant art. The sulfate esters are more strongly hydrophilic than the hydrolyzed alcohols or phenols. Thus, the hydrolysis will tend to produce compounds which are more oleophilic than the initial compounds. As in the emulsion slurry case, breaking of the emulsion will be facilitated.

The desired concentration of sulfate esters of ethoxylated alcohols or ethyoxylated alkylphenols in the emulsions will depend on the particular use intended for the emulsion and the particular environment of the use. Breaking rate will be dependent upon the initial concentration of the sulfate esters and the temperature of the emulsion. Concentrations between about 0.1 and 4.0% by volume of the aqueous phase will probably prove satisfactory in most well treatment operations. In other uses, those skilled in the art of emulsions will understand how to prepare the compositions.

Based upon the description contained in this specification, those skilled in the art will be capable of making substitutions in the actual examples of the compositions of matter, the methods, and in their components. These substitutions, however, will maintain the features which distinguish this invention from the prior art. The description provided is not meant to restrict the invention unless the prior art or the spirit of the appended claims necessitates a narrowing of the claims.

What is claimed is:

1. A method of treating a subterranean formation, said method comprising the steps of:
   (a) preparing an emulsion comprising water, oil, a surfactant and an ester, said ester comprising an emulsion breaker group bonded to a protecting group by an ester bond, said emulsion breaker group being selected from the group consisting of alkylbenzenesulfonic acid esters and alkylbenzenephosphoric acid esters wherein the alkyl group has between 4 and 18 carbon atoms and sulfate esters of ethoxylated alcohols and alkylphenols wherein the alkyl group has between 4 and 24 carbon atoms, said protecting group being selected from the group consisting of methyl, ethyl, propyl, butyl and compounds represented by the formula $$\begin{matrix} & C_lH_{2l+1} \\ & | \\ \text{\textlparen}CH_2-CH-O\text{\textrparen}_{\overline{m}}H \end{matrix}$$

wherein m=1, 2, or 3 and l=0, 1, or 2 and said ester bond being adapted to hydrolyze and release said emulsion breaker group from said protecting group at the temperature of said subterranean formation;
   (b) injecting said emulsion into said subterranean formation; and
   (c) permitting said ester bond to hydrolyze, thereby releasing said emulsion breaker group from said protecting group and resulting in the breaking of said emulsion.

2. A method as defined in claim 1 wherein the ester initially serves as a co-surfactant.

3. A method as defined in claim 1 wherein the emulsion is a water-in-oil emulsion which comprises an internal aqueous phase and an external oil phase comprising a blend of a liquid hydrocarbon, said surfactant, and said ester.

4. A method as defined in claim 3 wherein the alkyl group has between 8 and 18 carbon atoms.

5. A method as defined in either claim 3 or 4 wherein the alkyl group is a straight carbon chain.

6. A method as defined in claim 3 wherein the said protecting group is selected from the group consisting of 2-hydroxypropyl and hydroxyethyl.

7. A method as defined in claim 6 wherein the alkyl group is dodecyl.

8. A method as defined in claim 3 wherein the ester is 2-hydroxypropyldodecylbenzenesulfonate;

$$C_{12}H_{25}-\underset{}{\underset{}{\bigcirc}}-SO_2-OCH_2-\overset{OH}{\underset{|}{CH}}-CH_3.$$

9. A method as defined in claim 8 wherein the ester comprises 0.1 to 4% by volume of the oil phase.

10. A method as defined in claim 9 wherein the surfactant comprises 3 to 25% by volume of the oil phase.

11. A method as defined in claim 10 wherein the liquid hydrocarbon is selected from the group consisting of crude oil, diesel oil, gas oil, gasoline, kerosene, benzene, toluene, ethylbenzene, cyclohexane, hexane, decane, hexadecane, and mixtures thereof.

12. A method as defined in claim 3 wherein the ester is hydroxyethyldodecylbenzene sulfonate;

$$C_{12}H_{25}-\underset{}{\underset{}{\bigcirc}}-SO_2-OCH_2-CH_2-OH.$$

13. A method as defined in claim 12 wherein the ester comprises 0.1 to 4% by volume of the oil phase.

14. A method of claim 13 or claim 12 wherein the liquid hydrocarbon is diesel oil.

15. A method as defined in claim 3 wherein the ester is selected from the group consisting of compounds represented by the formula:

$$C_{12}H_{25}-\underset{}{\underset{}{\bigcirc}}-SO_2\text{\textlparen}OCH-CH_2\text{\textrparen}_{\overline{m}}OH;$$

and $$C_{12}H_{25}-\underset{}{\underset{}{\bigcirc}}-SO_2-\left(OCH_2\overset{CH_3}{\underset{|}{CH}}\right)_m-OH$$

wherein m=1-3.

16. A method as defined in claim 3 wherein the ester is a mixture having an average composition represented by the formula:

$$C_{12}H_{25}-\underset{}{\underset{}{\bigcirc}}-SO_2-\left(OCH_2-\overset{CH_3}{\underset{|}{CH}}\right)_{2.5}-OH$$

17. A method as defined in claim 1 wherein the emulsion is an oil-in-water emulsion which comprises an internal oil phase and an external aqueous phase comprising a blend of water, said surfactant, and said ester.

18. A method as defined in claim 17 wherein the ester is selected from the group consisting of:

$$R_1-O\text{\textlparen}CH_2-CH_2-O\text{\textrparen}_{\overline{m}}SO_3^{\ominus},$$

wherein
m=1, 2, 3, or 4, and $R_1$ is an alkyl group having between 4 and 24 carbon atoms.

19. A method as defined in claim 17 wherein the ester is selected from the group consisting of:

wherein m=1, 2, 3, or 4, and $R_1$ is an alkyl group having between 4 and 24 carbon atoms.

20. A method as defined in either claim 18 or 19 wherein $R_1$ is an alkyl group having between 8 and 24 carbon atoms.

21. A composition of matter for treating subterranean formations which comprises a water-in-oil emulsion comprising an internal aqueous phase and an external oil phase, said external oil phase comprising a blend of liquid hydrocarbon, a surfactant and an ester, said ester comprising an emulsion breaker group bonded to a protecting group by an ester bond, said emulsion breaker group being selected from the group consisting of alkylbenzenesulfonic acid esters and alkylbenzenephosphoric acid esters wherein the alkyl group has between 4 and 18 carbon atoms, said protecting group being selected from the group consisting of methyl, ethyl, propyl, butyl and compounds represented by the formula - wherein m=1, 2, or 3 and l=0, 1, or 2, and said ester bond being adapted to hydrolyze and release said emulsion breaker group from said protecting group at the temperature of said subterranean formation, said external oil phase comprising between about 3 and 50 volume percent of said emulsion, said surfactant comprising between about 0.5 and 40 weight percent of said external oil phase, and said ester being incorporated in sufficient amount so that upon hydrolyzing, said emulsion will break.

22. A composition of matter as defined in claim 21 wherein the ester comprises between 0.1% and 4.0% by volume of the blend.

23. A composition of matter as defined in claim 21 wherein the ester is selected from the group consisting of 2-hydroxypropyldodecylbenezenesulfonate and hydroxyethyldodecylbenezenesulfonate.

24. A composition of matter as defined in claim 21 wherein the ester is selected from the group consisting of:

and wherein m=1-3.

25. A composition of matter for treating subterranean formations which comprises an oil-in-water emulsion comprising an internal liquid hydrocarbon phase and an external aqueous phase, said external aqueous phase comprising a blend of water, a surfactant and an ester, said ester comprising an emulsion breaker group bonded to a protecting group by an ester bond, said emulsion breaker group being selected from the group consisting of sulfate esters of ethoxylated alcohols and alkylphenols wherein the alkyl group has between 4 and 24 carbon atoms, said protecting group being selected from the group consisting of methyl, ethyl, propyl, butyl and compounds represented by the formula wherein m=1, 2, or 3 and l=0, 1, or 2, and said ester bond being adapted to hydrolyze and release said emulsion breaker group from said protecting group at the temperature of said subterranean formation, said internal liquid hydrocarbon phase comprising between about 3 and 50 volume percent of said emulsion, said surfactant comprising between about 0.5 and 40 weight percent of said external aqueous phase, and said ester being incorporated in sufficient amount so that upon hydrolyzing, said emulsion will break.

* * * * *